UNITED STATES PATENT OFFICE.

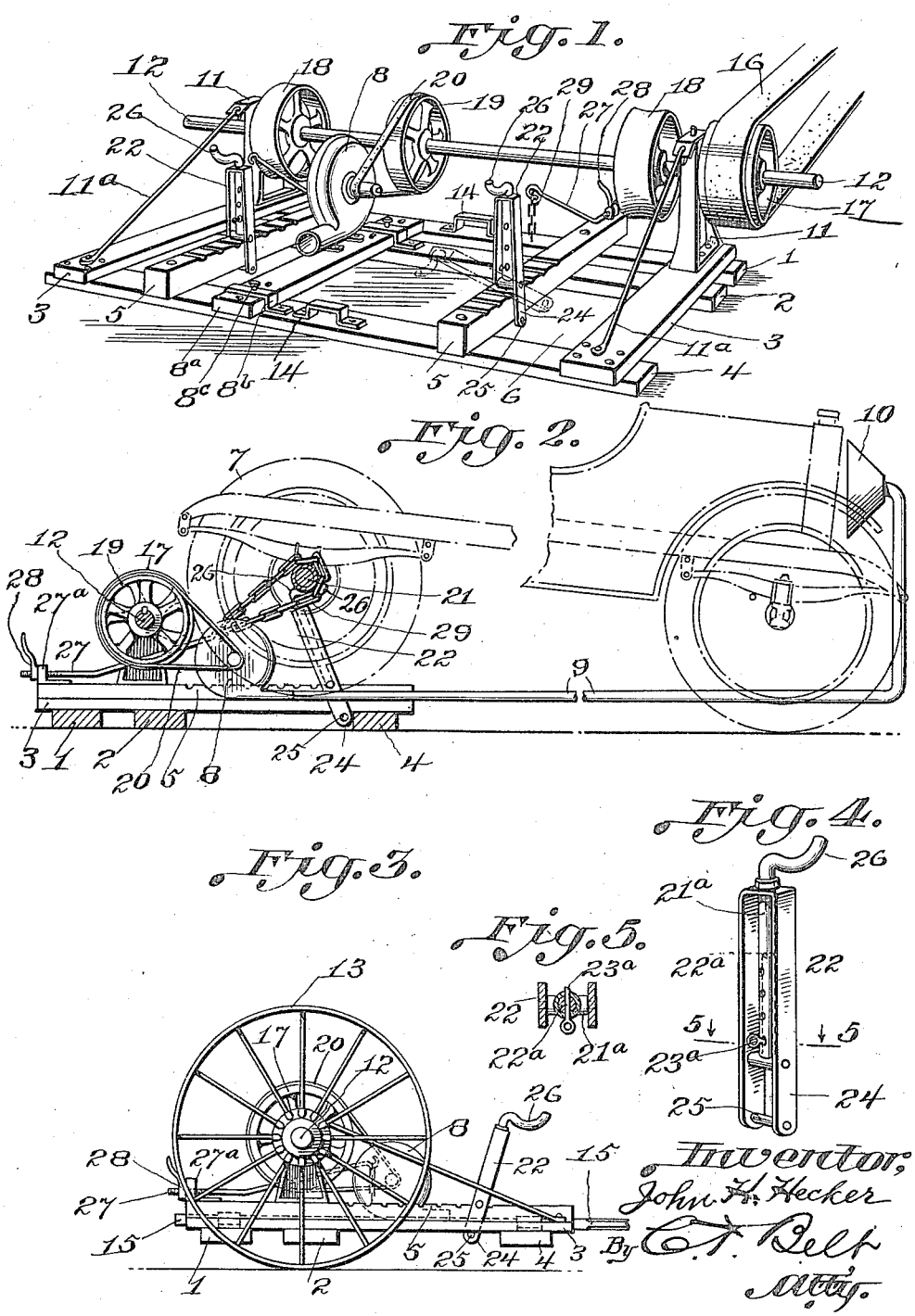

JOHN H. HECKER, OF COVINGTON, OHIO.

POWER-TRANSMISSION APPLIANCE FOR AUTOMOBILES.

1,280,459.                    Specification of Letters Patent.         Patented Oct. 1, 1918.

Application filed April 18, 1918.   Serial No. 229,324.

*To all whom it may concern:*

Be it known that I, JOHN H. HECKER, a citizen of the United States, residing at Covington, in the county of Miami and State of Ohio, have invented certain new and useful Improvements in Power-Transmission Appliances for Automobiles, of which the following is a specification.

This invention relates to power transmission from automobiles or motor vehicles to pulley shafts for utilizing the latter in operating various machinery.

The object of the invention is to provide a transportable bed frame having a pulley shaft journaled thereon, and provided with novel and peculiar means for suspending a pair of automobile wheels in frictional contact with the shaft wheels for driving the latter during the operation of the automobile.

A further object of the invention is to provide a special supporting bed or frame having a pair of rack bar beams on which a pair of axle raisers is adjusted for suspending the rear wheels of an automobile on the frame.

A still further object of the invention is to provide a specially constructed bed frame having pulley shaft journals, and rack bars having a device for varying the frictional contact of a pair of automobile wheels on the shaft wheels, and to furnish a novel and peculiar device operated on the rack bars for raising and suspending the wheel axle so as to permit the wheels to be operated as usual by the automobile motor during said frictional contact. and to furnish said shaft with means for operating a blower attached to said frame.

Various other objects, advantages and improved results are attainable in the practical application of the invention, as will be hereinafter described.

In the accompanying drawings forming part of this application:

Figure 1 is a perspective view of the invention in position to have an automobile applied thereto.

Fig. 2 is a section of the device showing the rear wheels of an automobile applied thereto and an air distributer as for the radiator of the automobile.

Fig. 3 is a side elevation as in transportable position.

Fig. 4 is a detail perspective view of one of the lifting levers.

Fig. 5 is a detail section of one of the lifting levers.

The same reference characters denote the same parts throughout the several views of the drawings.

In carrying out my invention I form a bed or supporting frame comprising a plurality of beams 1, 2, 3 and 4, and a pair of bars 5 specially arranged so as to leave a frame opening 6 for the rear wheels 7 of an automobile, as will be hereinafter referred to. This bed or supporting frame has mounted thereon a blower 8 adapted to have an air pipe 9 attached thereto for conveying air to a distributer 10 for cooling the radiator during the operation of an automobile when coupled with said frame, as will be hereinafter fully described.

The frame is provided with a pair of standards 11 having brace rods 11$^a$, and forming bearings for a shaft 12, and the ends of said shaft are adapted to have applied thereto traction wheels 13, and the frame has cleats 14 for a tongue 15 which has a clevis attachable to the rear of the automobile for transporting the frame to various places, as may be desired or as occasion may demand, so as to operate a belt 16 working over a pulley 17 secured to one end of the shaft. The shaft is provided with a pair of wheels 18 for frictional engagement with the rear wheels 7 of an automobile, and thereby revolves the shaft. The shaft is also provided with a pulley 19 having a belt 20 for operating the blower 8.

The device for raising and suspending the axle 21 of the wheels 7 consists of a pair of levers 22 having a forked end to straddle the bars 5 so that this end of the levers has adjustable engagement with a toothed rack 23 secured to the top of the bars 5. The end of the fork prongs 24 is provided with a pin or bolt 25 for retaining the levers 22 on the bars 5. The other end of the levers 22 is provided with a hook 26 forming an axle seat or rest, and having a tubular stem 21$^a$ adjustable on a lever rod 22$^a$ by means of a bolt or pin 23$^a$.

In order to hold the axle with respect to the shaft for the purpose of having the axle wheels engage the shaft wheels, and for varying the frictional contact or bearing of said wheels, I provide the rack bars with an adjusting rod 27 having a screw end working through a keeper 27$^a$, and provided with a hand nut 28. The other end of the rod 27 is provided with means such as a chain 29 attachable to the axle.

In practical application the frame is transported to any desired position relative to a sawing or other machine to be operated, the tongue and traction wheels are removed from the shaft, the frame anchored and the driving belt applied. An automobile is backed up to the frame so that the rear wheels are run over one of the frame beams into the frame openings 6, the hooks 26 are placed under the axle and the levers are operated on the rack bars for raising and suspending the wheels out of contact with the frame, the chains are applied to the axle so as to hold the axle wheels against the shaft wheels, and the adjusting rods may be operated for varying the pressure of the wheels 7 on the friction wheels during the usual operation of the motor of the automobile for transmitting driving power to the belt.

It will be observed that the frame permits the rear wheels of an automobile to be backed into and held by the frame without jacking or otherwise lifting the wheels into position relative to the wheels 18, and that in such backed-in position the axle is raised by the levers just enough to elevate the wheels so that they may be free to revolve in the frame openings and against the friction wheels.

It will also be observed that the levers hold the axle as in pivotal position relative to the shaft, and that the adjusting rods afford expeditious means for governing the bearing of the axle wheels on the shaft wheels.

I do not wish to be understood as confining the invention to any particular size, material or shape, nor to the manner or means of connecting or attaching the various parts, nor do I wish to limit myself in the application of or purposes to which the invention may be applied, but reserve the right to make such changes and variations therein and in the application thereof as may come within the scope of the appended claims.

Having thus described my invention, what I claim as new and desire to secure by Letters Patent is:

1. A power transmission appliance for automobiles, comprising a supporting frame adapted to permit the rear wheels of an automobile to be backed thereinto, a shaft journaled on the frame, a pair of friction wheels attached to the shaft, a pair of rack bars secured to the frame, a pair of levers operated on the bars for raising and suspending the automobile wheels in engagement with the friction wheels, and adjusting rods secured to the frame and connected with the rear axle of the automobile for varying the said engagement.

2. A power transmission appliance for automobiles, comprising a bed frame adapted to have the rear wheels of an automobile backed into certain of the frame openings so as to be chucked by a frame member, a shaft journaled on the frame opposite said member, friction wheels attached to the shaft for engaging the automobile wheels, rack bars spanning the frame under the shaft, and levers having a free end pivotally riding on said bars for raising and suspending the automobile wheels.

3. In a power transmission device, the combination with a bed frame, a shaft journaled on the frame, friction wheels attached to the shaft, and a driving pulley secured to the shaft, of a pair of rack bars mounted on the frame, and a pair of levers riding on the rack bars and having end members connected under the bars for limiting the swinging movement of the levers.

4. In a power transmission device, the combination with a bed frame, a shaft journaled on the frame and having end extensions for the application of traction wheels, friction wheels attached to the shaft, a driving pulley secured to the shaft, a blower mounted on the frame between the shaft wheels, a pulley on the shaft for operating the blower, a pair of rack bars secured to the frame under said shaft, a pair of levers operated on the bars for raising and suspending a wheel axle of an automobile, and means attached to the frame for varying the contact of the friction and axle wheels.

5. In a power transmission appliance for automobiles, a shaft, a pair of friction wheels secured to the shaft, a device for raising and suspending the rear axle of an automobile with the wheels thereof in contact with the said friction wheels, comprising a pair of rack bars, a lifting lever adjustably secured to each bar and having a seat on the free end thereof for holding said axle suspended.

6. The combination with a fixed rack bar, of a lifting device comprising a lever having pivot adjustment on the bar, a rod secured to the lever, a tubular stem adjustable on the rod and having a seat end projecting from the lever, and means for adjustably securing the rod in the stem.

In witness whereof I hereunto set my hand in the presence of two witnesses.

JOHN H. HECKER.

Witnesses:
GEORGE STREIB,
GERTRUDE M. SIFFORD.